United States Patent
Leng

(10) Patent No.: US 6,336,525 B1
(45) Date of Patent: Jan. 8, 2002

(54) DISC BRAKE OIL PRESSURE ADJUSTING DEVICE FOR BIKES

(76) Inventor: Tony Leng, No.68, Lane 60, Guang Ming South Road, Nan Tou City, Nan Tou Hsien (TW)

( * ) Notice: Subject to any disclaimer, the term of this patent is extended or adjusted under 35 U.S.C. 154(b) by 0 days.

(21) Appl. No.: 09/597,753

(22) Filed: Jun. 19, 2000

(51) Int. Cl.[7] ................................................. B62L 1/06
(52) U.S. Cl. ................... 188/24.19; 188/344; 188/352; 188/79.52; 74/488
(58) Field of Search ........................... 188/24.19, 24.22, 188/24.11, 344, 352, 79.52; 74/488

(56) References Cited

U.S. PATENT DOCUMENTS

| | | | | |
|---|---|---|---|---|
| 2,189,904 A | * | 2/1940 | Insko | 192/217.3 |
| 3,935,930 A | * | 2/1976 | Kine | 188/344 |
| 4,023,653 A | * | 5/1977 | Yoshigai | 188/24 |
| 4,921,081 A | * | 5/1990 | Chilcote | 188/344 |
| 5,050,381 A | * | 9/1991 | Matsuno et al. | 60/584 |
| 5,538,270 A | * | 7/1996 | Gajek et al. | 280/264 |
| 5,813,501 A | * | 9/1998 | Terry, Sr. | 188/344 |
| 6,003,639 A | * | 12/1999 | Buckley et al. | 188/26 |
| 6,119,821 A | * | 9/2000 | Chiang | 188/71.7 |

* cited by examiner

Primary Examiner—Robert J. Oberleitner
Assistant Examiner—Xuan Lan Nguyen
(74) Attorney, Agent, or Firm—Troxell Law Office PLLC

(57) ABSTRACT

A disc brake oil-adjusting device for bikes includes a handle, a main cylinder and an auxiliary cylinder having one end communication with the main cylinder and the other end protruding out of the handle. An adjusting device screws with the interior of the auxiliary cylinder and has an adjusting rod and turning button combined with a tail end of the adjusting rod. A protective cover and a grip are pivotally connected with the handle, and the protective cover has an opening for receiving the turning button so as to be located near the grip and turned to move the adjusting rod move so as to control the auxiliary cylinder in its capacity to absorb excessive brake oil, lowering the temperature of the disc to keep safety in running a bike.

7 Claims, 5 Drawing Sheets

DISC BRAKE OIL PRESSURE ADJUSTING DEVICE FOR BIKES

BACKGROUND OF THE INVENTION

This invention relates to a disc brake oil pressure-adjusting device for bikes, particularly to one convenient to handle, and having high safety.

A first conventional disc brake oil pressure device mainly includes a lining 1 and a disc 2 positioned spaced apart from the lining 1 with certain gap A, and an oil pressure device 3 located behind the lining 1. In handling the brake, the oil pressure device 3 pushes the lining 1 forward to contact the disc 2 so as to stop a bike. As the lining 1 rubs the disc 2 to produce high friction heat, which causes both the lining 1 and the disc 2 to inflate so that the gap A may become smaller. In addition, the oil pressure device 3 is frequently used to let the oil also get warmer and warmer, impossible to lower the temperature of the lining 1, resulting in possible locking dead of the lining 1 and the disc 2 to cause danger.

A second conventional disc brake oil adjusting device shown in FIG. 2 main have a disc brake oil compensating device 4 formed on an outer side of a grip. The oil pressure compensating device 4 includes an oil store chamber 5, female threads formed in an upper edge of the oil store chamber 5, an oil stopper 6 provided in an front end of the store chamber 5, a ring 7 fitted around the oil stopper 6, a passive member 8 provided at a front end of the oil stopper 6 and having male threads formed in an outer diameter and a closed end surface 9. The closed end surface 9 of the passive member 8 contacts an upper end of the oil stopper 6. Further, an active member 10 is provided at a front end of the passive member 8, having a tubular shape and a center through hole 11 and female threads formed in an inner diameter to engage the male threads of the passive member 8. The active member 10 has male threads formed on an outer surface to engage the female threads of the oil store chamber 5. Further a turning button 12 is combined with an upper end of the active member 10 to adjust oil volume. This second conventional disc brake oil-adjusting device has a complicated structure to have many components, not easy to assemble, additionally provided outside of the handle not integral with a bike. Moreover, the turning button 12 is on the other side of the handle, so a rider has to release a hand from the handle to grip the turning button, not so safe to handle.

SUMMARY OF THE INVENTION

The first objective of the invention is to offer a disc brake oil adjusting device for bikes, providing a main cylinder and an auxiliary cylinder inside a handle, and the main cylinder being parallel to the handle, the auxiliary cylinder located on the main cylinder and communicating with the main cylinder so as to increase space for absorbing excessive brake oil.

The second objective of the invention is to offer a disc brake oil pressure adjusting device for bikes, having a main cylinder and an auxiliary cylinder provided in a handle to make it integral with the handle so as to reduce components needed to facilitate assembling and disassembling.

The third objective of the invention is to offer a disc brake oil pressure adjusting device for bikes, having the auxiliary cylinder engaged with an adjusting device in its interior, and the adjusting device consisting of an adjusting rod and a turning button. The adjusting rod is provided in the auxiliary cylinder by means of threads, and the turning button is fixed with a tail end of the adjusting rod, located outside of the handle to be turned for adjusting the brake oil.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
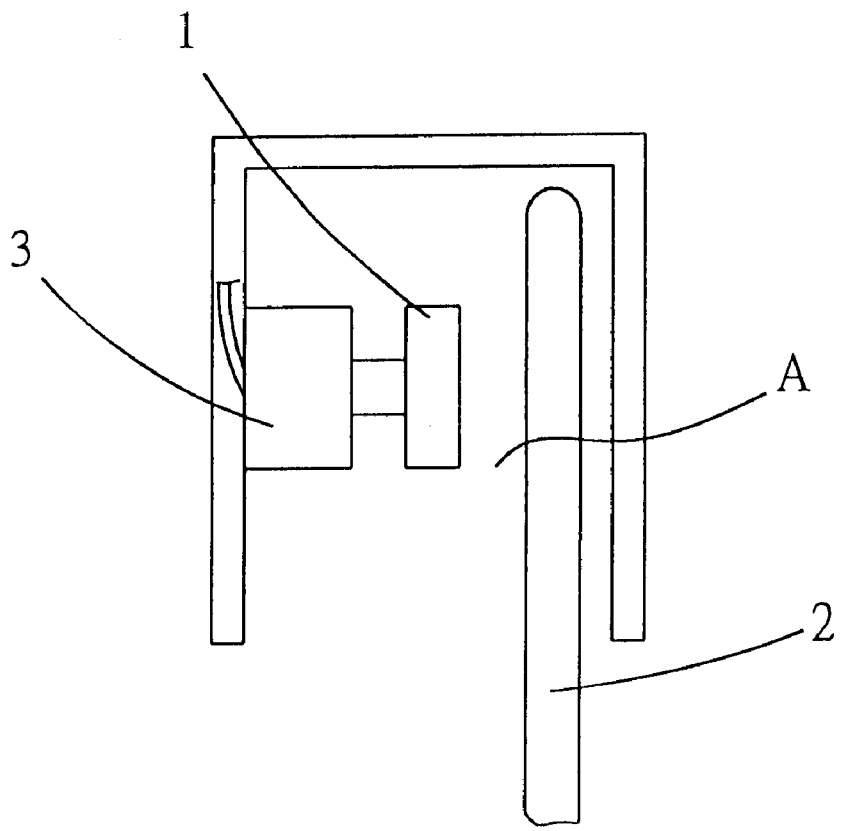
FIG. 1 is a simplified view of a conventional disc brake.
Figure 2:
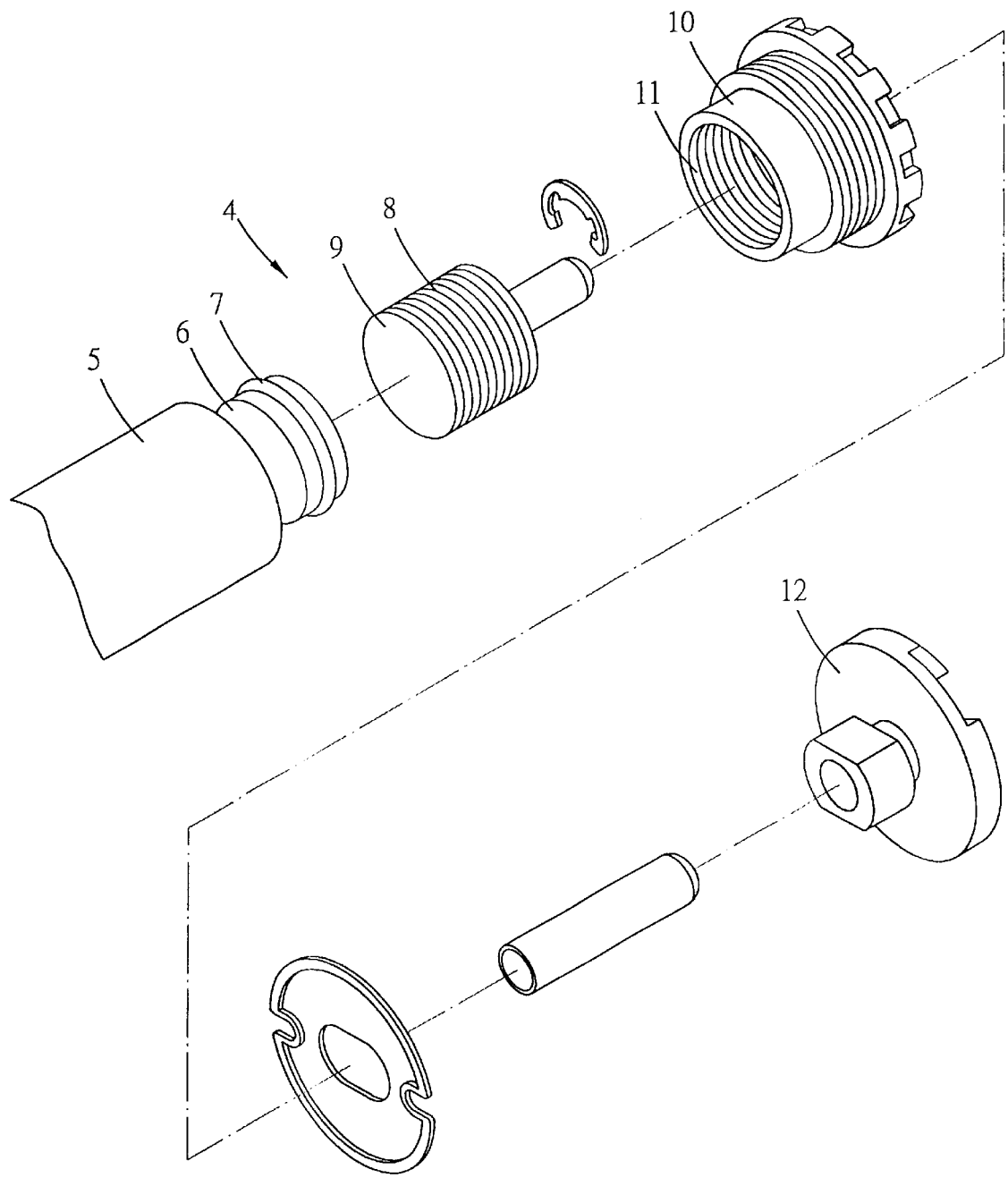
FIG. 2 is an exploded perspective view of a conventional oil pressure-adjusting device.
Figure 3:
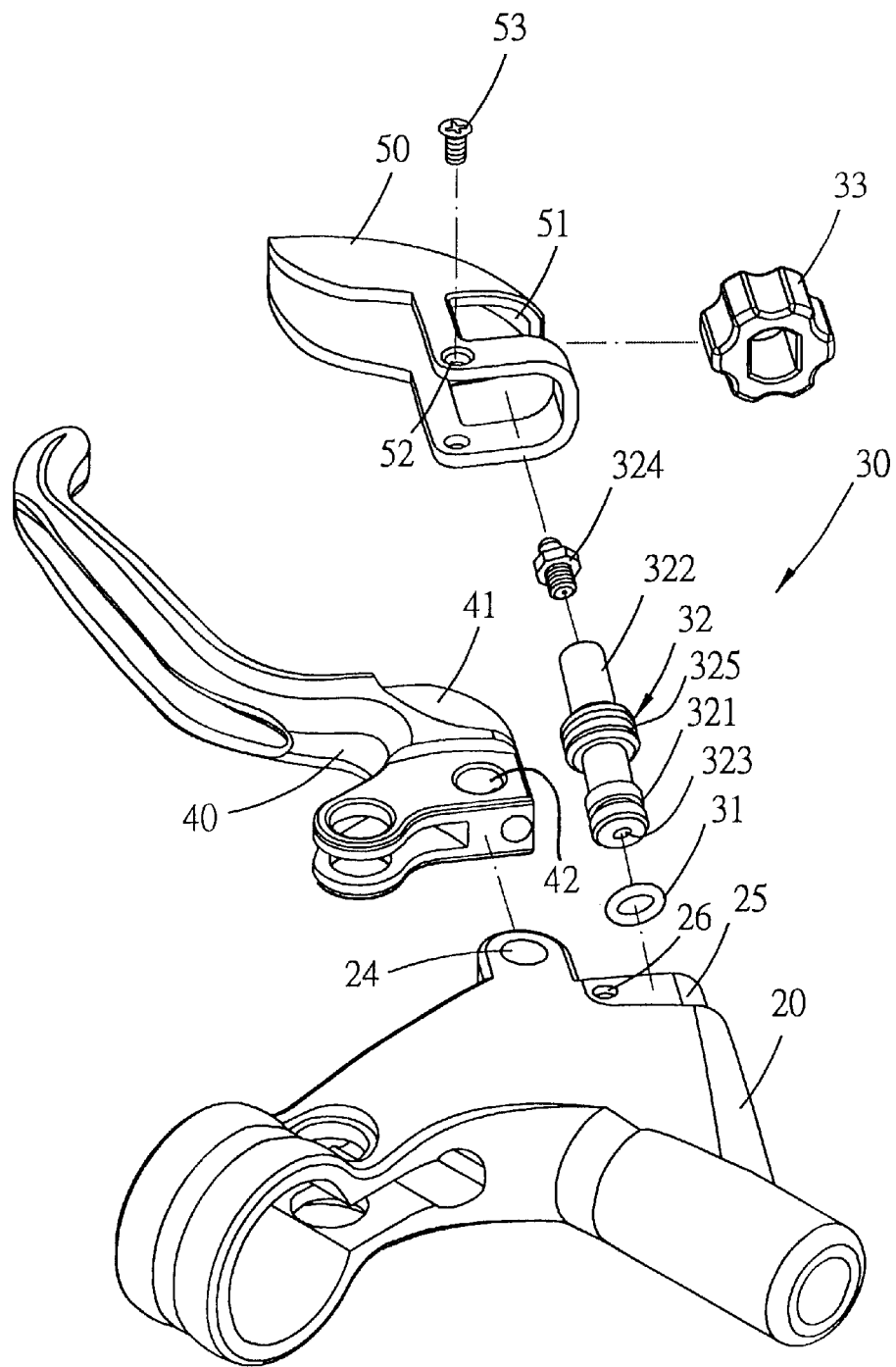
FIG. 3 is an exploded perspective view of a disc brake oil pressure-adjusting device for bikes in the present invention.
Figure 4:
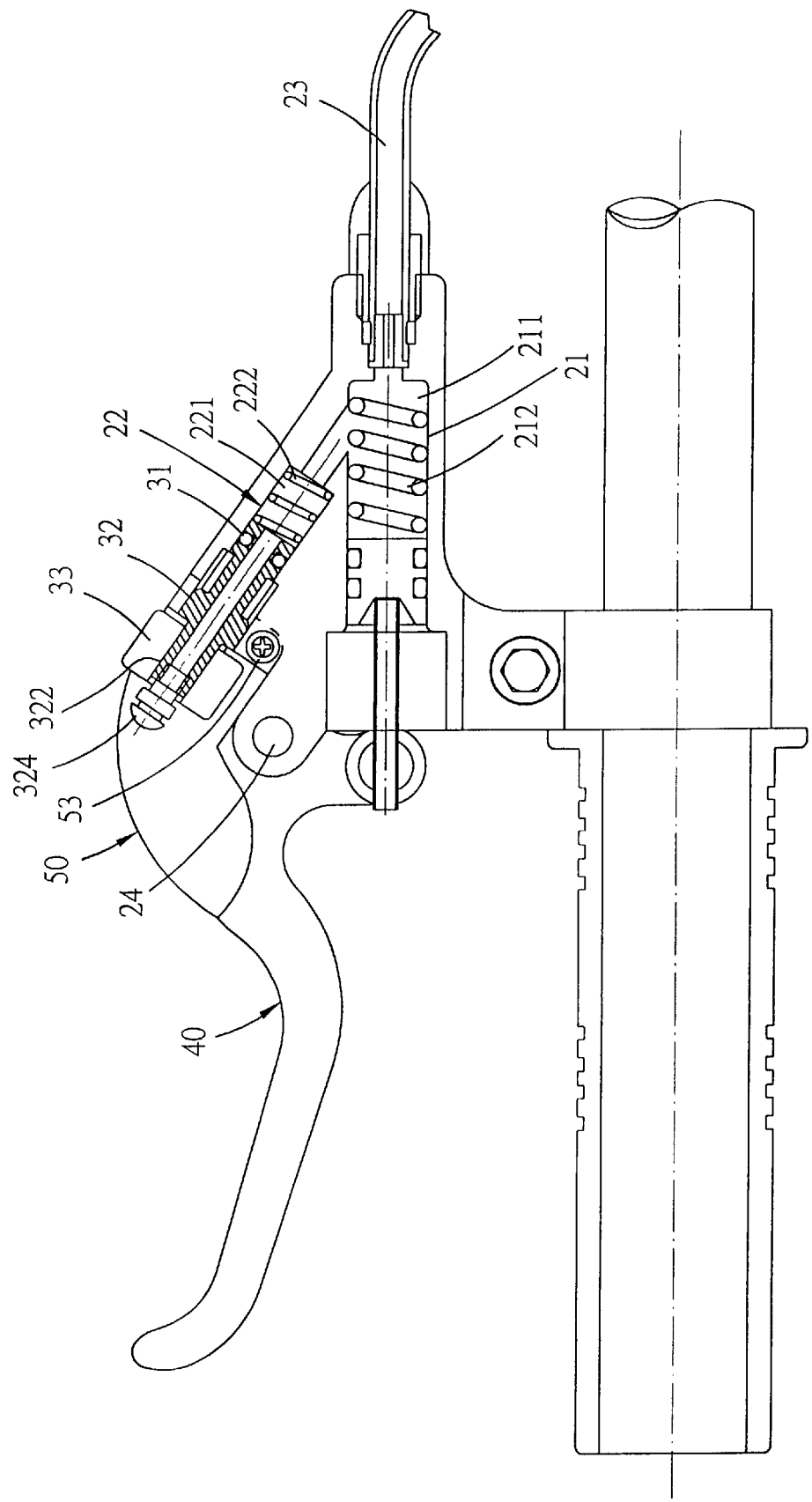
FIG. 4 is a cross-sectional view of the disc brake oil pressure-adjusting device for bikes in the present invention.

A preferred embodiment of a disc brake oil pressure-adjusting device for bikes in the present invention, as shown in FIGS. 3 and 4, includes a handle 20, an adjusting device 30, a grip 40 and a protective cover 50 as main components.

The handle 20 is shaped nearly as a triangle, having a main cylinder 21 consisting of a main adjusting chamber 211 and a coil spring 212 in its interior, and being almost parallel to the handle 20, an oil pipe 23 connected to the right side of the main cylinder 21 and protruding out of the right side of the handle 20.

Further, an auxiliary cylinder 22 is provided slantingly on the main cylinder 21 for a certain angle, having one end communicating with the main cylinder 21, an auxiliary adjusting chamber 221, a coil spring 222 and female threads 223. Further, the handle 20 has a pivot hole 24 formed in a left upper portion, a ramp 25 formed in a left top end, and a threaded hole 26 nearly between the pivot hole 24 and the ramp 25.

The adjusting device 30 is positioned in the auxiliary cylinder 22, having a ring 31, an adjusting rod 32 and a turning button 33. The adjusting rod 32 has an annular groove 321 in an intermediate portion of the size about the same as the ring 31 for the ring 31 to engage therein, and male threads 325 to engage with the female threads 223 of the auxiliary cylinder 22, and a fitting portion 322 formed in an upper portion and having a nearly rectangular cross-section for a turning button 33 having the same inner hole to fit around the fitting portion 322. Further, the adjusting rod 32 has a center through hole 323 with female threads formed in a upper end to screw with an oil nozzle 324.

The grip 40 has a ramp 41 with a certain curvature formed in a left upper end, a pivot hole 42 formed in a right upper end to pivotally connect the grip 40 to the handle 20.

The protective cover 50 has a round hole 52 respectively in two ends of an upper side and a lower side, and a bolt 53 passing through the two round holes 52 to screw with the the threaded hole 26 of the handle 20 to secure the protective cover 50 with the handle 20, covering the rectangular ramp 25 of the handle 20 to form a flat surface. Further the protective cover 50 has a curved portion extending to the right for a certain distance to cover the curved ramp 41 of the grip 40 to form a flat surface. Further, the protective cover 50 has a rectangular opening 51 in an intermediate portion to receive the turning button 33 therein, which protrudes out a little so as to easily be turned for adjusting the brake oil.

Figure 6:
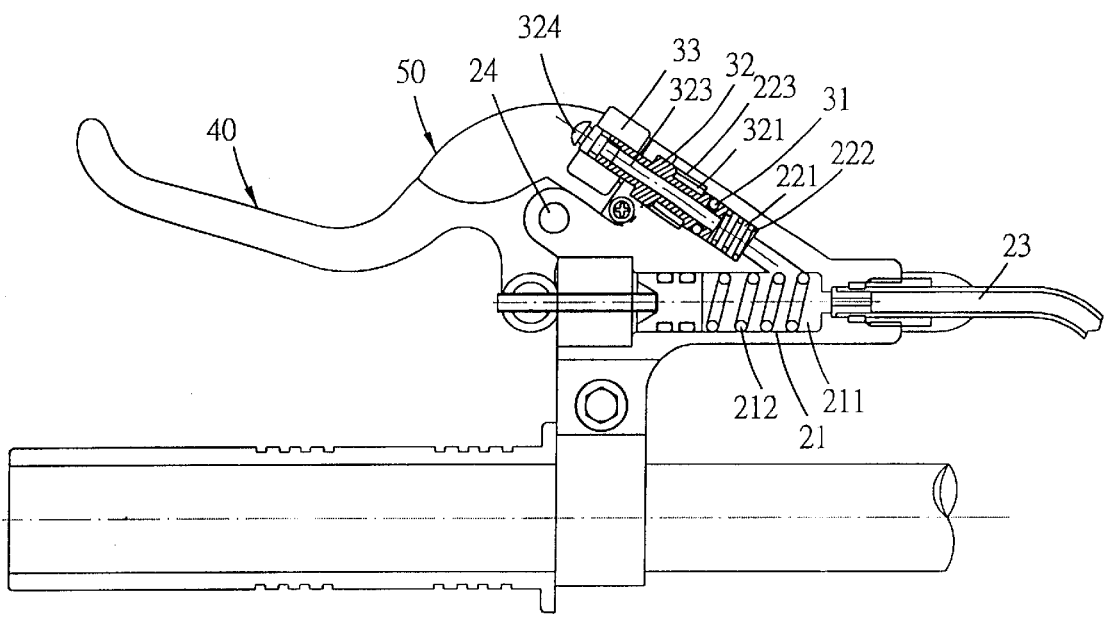

Next, how to operate the disc brake oil pressure-adjusting device is described. As shown in FIG. 6, when a user turns the turning button 33 to adjust the brake oil volume, the turning button 33 turns at its original position, rotating the fitting portin 322, where the adjusting rod 32 moves in the handle 20. When the adjusting rod 32 moves towards the main cylinder 21, the auxiliary adjusting chamber 221 reduces its dimensions, so the brake oil will be supplied toward the main cylinder 21.

Figure 5:
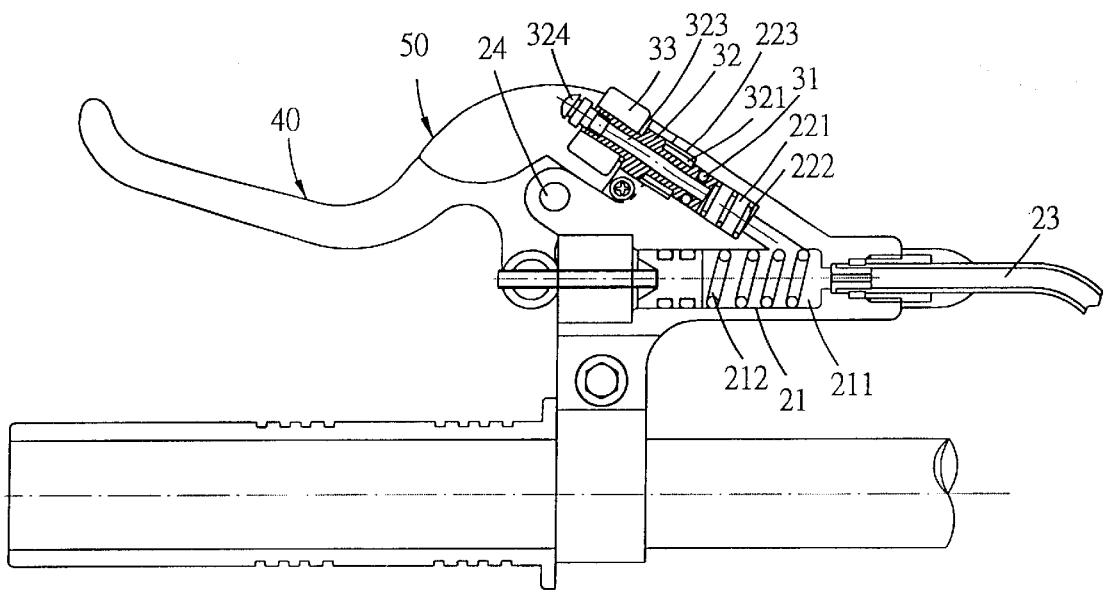
FIG. 5 is a cross-sectional view of the disc brake oil pressure adjusting device for bikes in the present invention, showing a first stage of its operation: and, FIG. 6 is a cross-sectional view of the disc brake oil pressure-adjusting device for bikes in the present invention, showing a second stage of its operation.

Next, as shown in FIG. 5, when the adjusting rod 32 moves away from the adjusting device 30, the auxiliary adjusting chamber 221 increases its dimensions to absorb excessive brake oil. When the brake is frequently used or the air temperature is high, the lining and the disc may inflate because of too high temperature, and the temperature of the oil rises. Then the turning button 33 has to be turned to let the adjusting rod 32 move away from the adjusting device 30, and the auxiliary adjusting chamber 221 increases its dimensions to absorb excessive or inflated hot brake oil so as to avoid a continual supply of brake oil, to prevent a dead lock phenomenon of the lining and the disc, because of the temperature continuing to rise. This achieves a lowering temperature effect to operate a bike safely.

In addition, the main and the auxiliary cylinder 21 and 22 are positioned in the handle 20, lessening components to facilitate assembly and disassembly.

Further, as the turning button 33 connected to the adjusting rod 32 of the adjusting device 30 is positioned near the grip 40, so a user can use his/her fingers holding the grip 40 to adjust oil volume, with no need to separate the hand from the grip 40, or to stop a bike or get down the bike.

While the preferred embodiment of the invention has been described above, it will be recognized and understood that various modifications may be made therein and the appended claims are intended to cover all such modifications that may fall within the spirit and scope of the invention.

I claim:

1. A disc brake oil pressure-adjusting device for bikes comprising:
   a handle having a main cylinder and an auxiliary cylinder positioned in an interior of the handle, the auxiliary cylinder having an end communicating with the main cylinder; and,
   an adjusting device positioned at another end of the auxiliary cylinder having an adjusting rod and a turning button, the adjusting rod connected to the auxiliary cylinder, the turning button connected to a tail end of the adjusting rod to adjust a capacity of the auxiliary cylinder,
   the adjusting rod having a center through hole, a tail end of the center through hole having female threads to engage with an oil nozzle.

2. The device of claim 1, wherein a protective cover is provided having an opening in an upper side of the protective cover to receive the turning button therein.

3. The device of claim 1, wherein the adjusting rod has a ring engaging an annular groove formed in an intermediate portion of the adjusting rod.

4. The device of claim 1, wherein the adjusting rod has a fitting portion having a rectangular cross-section, the turning button having a center opening having a shape substantially complementary to the rectangular cross-section of the fitting portion to fit around the fitting portion.

5. A disc brake oil pressure-adjusting device for bikes comprising:
   a handle having a main cylinder and an auxiliary cylinder positioned in an interior of the handle, the auxiliary cylinder having an end communicating with the main cylinder; and,
   an adjusting device positioned at another end of the auxiliary cylinder having an adjusting rod and a turning button, the adjusting rod connected to the auxiliary cylinder, the turning button connected to a tail end of the adjusting rod to adjust a capacity of the auxiliary cylinder,
   the adjusting rod having a fitting portion having a rectangular cross-section, the turning button having a center opening having a shape substantially complementary to the rectangular cross-section of the fitting portion to fit around the fitting portion.

6. The device of claim 5, wherein a protective cover is provided having an opening in an upper side of the protective cover to receive the turning button therein.

7. The device of claim 5, wherein the adjusting rod has a ring engaging an annular groove formed in an intermediate portion of the adjusting rod.

* * * * *